US007414327B2

(12) United States Patent
Kusumoto et al.

(10) Patent No.: US 7,414,327 B2
(45) Date of Patent: Aug. 19, 2008

(54) STARTER

(75) Inventors: Keiichi Kusumoto, Tokyo (JP); Hayato Yamauchi, Tokyo (JP); Motoaki Kimura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/447,850

(22) Filed: Jun. 7, 2006

(65) Prior Publication Data

US 2007/0200354 A1 Aug. 30, 2007

(30) Foreign Application Priority Data

Feb. 27, 2006 (JP) ............................ 2006-049788

(51) Int. Cl.
*H02K 11/00* (2006.01)

(52) U.S. Cl. .................................................... 290/38 C

(58) Field of Classification Search ................ 290/38 R
See application file for complete search history.

(56) References Cited

U.S. PATENT DOCUMENTS

| | | | | |
|---|---|---|---|---|
| 6,008,555 | A * | 12/1999 | Garr et al. | 310/68 C |
| 6,028,381 | A * | 2/2000 | Yumiyama et al. | 310/68 C |
| 6,520,137 | B2 * | 2/2003 | Ooizumi et al. | 123/179.3 |
| 6,552,890 | B1 * | 4/2003 | Renner et al. | 361/104 |
| 6,759,756 | B2 * | 7/2004 | Shiga et al. | 290/38 R |
| 6,838,780 | B2 * | 1/2005 | Shiga et al. | 290/38 R |
| 7,067,934 | B2 * | 6/2006 | Kitagawa et al. | 290/38 R |
| 2004/0100351 | A1 * | 5/2004 | Unno et al. | 337/100 |
| 2005/0051126 | A1 * | 3/2005 | Oomi et al. | 123/179.25 |

FOREIGN PATENT DOCUMENTS

| | | | |
|---|---|---|---|
| JP | 02-213456 | A | 8/1990 |
| JP | 09-273464 | A | 10/1997 |
| JP | 2003-148315 | A | 5/2003 |
| JP | 2005-083259 | A | 3/2005 |
| JP | 2005-110484 | A | 4/2005 |
| JP | 2005-120914 | A | 5/2005 |

* cited by examiner

*Primary Examiner*—Joseph Waks
(74) *Attorney, Agent, or Firm*—Sughrue Mion, PLLC

(57) ABSTRACT

Provided is a starter which reliably cuts off any abnormal current caused to flow through the motor and which can reduce the possibility of current cutoff in the case of normal supply current. According to the present invention, a starter includes: a motor having a field coil; and an electromagnetic switch for supplying an electric current from a battery to the motor to start an engine through a pinion gear, in which: a metal conductor is connected to an upstream side of the field coil to which the electric current is supplied; and the metal conductor has a narrowed portion endowed with a fuse function and having a small sectional area.

2 Claims, 4 Drawing Sheets

STARTER

BACKGROUND OF THE INVENTION

1. Field of the Invention

The present invention relates to a starter equipped with a motor having a field coil, and an electromagnetic switch adapted to supply an electric current from a battery to the motor to start an engine through a pinion gear.

2. Description of the Related Art

A known conventional starter is equipped with a motor having an armature to which electricity is supplied from a battery through a brush and adapted to generate a torque in the armature, and an electromagnetic switch for ON/OFF-controlling the battery current caused to flow through the armature, with a part of a pigtail connected to the brush being formed of a low melting point material providing a fuse function (see, for example, JP 2003-148315 A).

In the above conventional starter, when the battery current is continuously supplied to the motor due to failure of the start switch, etc., the pigtail undergoes a fusing to thereby stop the supply of the electricity to the armature, whereby breakage of the starter is prevented.

Likewise, to prevent starter breakage, another known starter is equipped with a brush lead wire one end of which is mechanically and electrically connected to a brush and the other end of which is directly soft-soldered to a movable contact of an electromagnetic switch (see, for example, JP 2005-83259 A).

The pigtail as disclosed in JP 2003-148315 A is connected to a slidable brush, so it can happen that when, for example, the pigtail moves with the brush and comes close to a nearby component, an abnormal current flows to cause the pigtail, which has undergone a fusing, to come into contact with the nearby component to develop a short circuit, making it impossible to cut off the battery current.

In the brush lead wire as disclosed in JP 2005-83259 A, its melting temperature is determined by a soft solder material used, the melting point of which is usually low, so even when normal current is supplied thereto, the brush lead wire may undergo a fusing, making it impossible to start an engine.

SUMMARY OF THE INVENTION

The present invention has been made with a view toward solving the above problems in the prior art. It is an object of the present invention to provide a starter which reliably cuts off any abnormal current caused to flow through the motor and which can reduce a possibility of current being cutoff in the case of normal supply current.

According to the present invention, a starter includes: a motor having a field coil; and an electromagnetic switch for supplying an electric current from a battery to the motor to start an engine through a pinion gear, in which: a metal conductor is connected to an upstream side of the field coil to which the electric current is supplied; and the metal conductor has a narrowed portion endowed with a fuse function and having a small sectional area.

According to the present invention, a starter includes: a motor having a field coil; and an electromagnetic switch for supplying an electric current from a battery to the motor to start an engine through a pinion gear, in which a metal conductor is connected to an upstream side of the field coil to which the electric current is supplied; and the metal conductor is endowed with a fuse function and is composed of a material having a larger electrical resistance than the field coil.

According to the present invention, a starter reliably cuts off any abnormal current caused to flow through the motor and can reduce the possibility of current cutoff in the case of normal supply current.

DESCRIPTION OF THE PREFERRED EMBODIMENTS

In the following, embodiments of the present invention will be described with reference to the drawings. In the following description of the embodiments, the same or equivalent components and portions are indicated by the same reference symbols.

Embodiment 1

Figure 1:
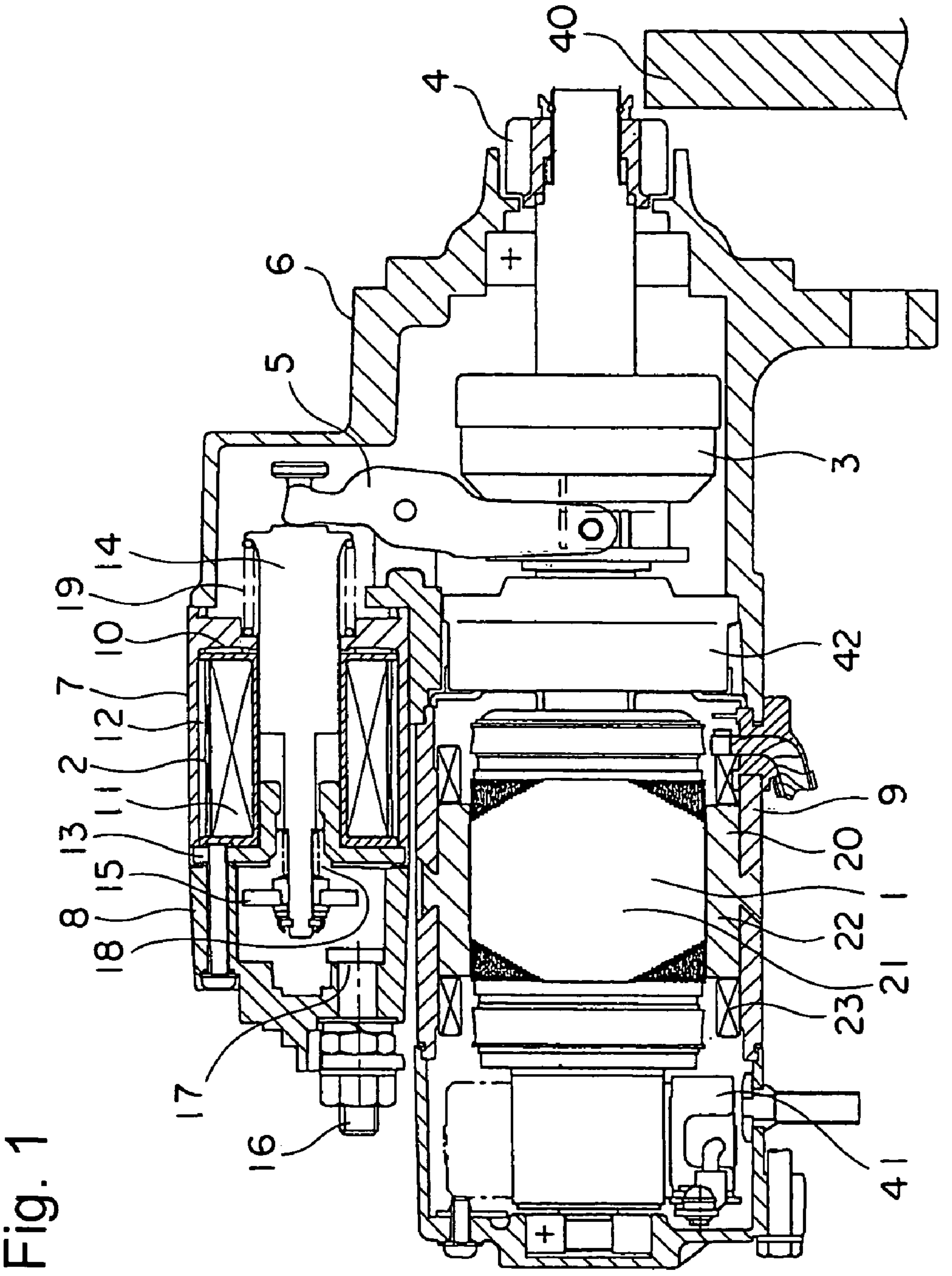
FIG. 1 is a sectional view of a starter according to Embodiment 1 of the present invention.
Figure 2:
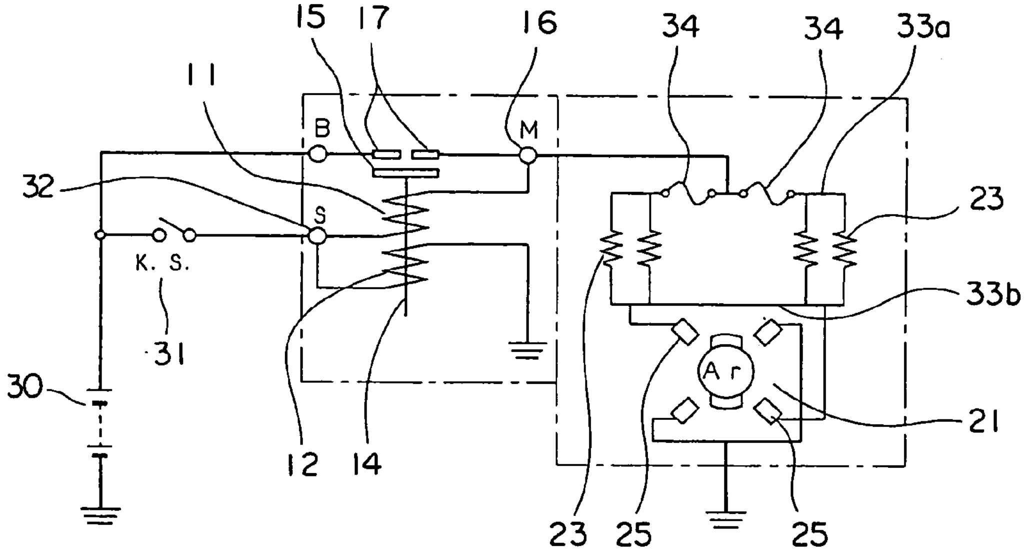
FIG. 2 is a circuit diagram of the starter of FIG. 1.

FIG. 1 is a sectional view of a starter according to Embodiment 1 of the present invention, and FIG. 2 is a circuit diagram of the starter of FIG. 1.

This starter is equipped with a motor 1, an electromagnetic switch 2 for turning on and off supply of electricity to the motor 1, a speed reduction mechanism 42 connected to the motor 1, a one-way clutch 3 movable in an axial direction of a shaft of the motor 1, a pinion gear 4 connected to the one-way clutch 3 and adapted to rotate with the one-way clutch 3, and a lever 5 rotatably provided between the electromagnetic switch 2 and the one-way clutch 3. The speed reduction mechanism 42, the one-way clutch 3, and the lever 5 are accommodated in a housing 6.

In the electromagnetic switch 2, a switch cover 8 is connected to an opening of a solenoid case 7.

A cylindrical bobbin 10 is provided inside the solenoid case 7. In the outer periphery of the bobbin 10, there is provided a suction coil 11 formed by winding a conductor. On an outer side of the suction coil 11, there is provided, through the intermediation of an insulating sheet, a retaining coil 12 formed by winding a conductor. The respective conductors of the suction coil 11 and the retaining coil 12 are wound in opposite directions.

A stationary core 13 is press-fitted into an inner peripheral portion of the solenoid case 7 on the left-hand side. A reciprocally slidable plunger 14 is inserted into an inner peripheral portion of the stationary core 13. A movable contact 15 is fixed to the end of the plunger 14 on a side opposite to the lever 5. The movable contact 15 is opposed to a stationary contact 17 formed at an end of a motor terminal 16. Between the movable contact 15 and the plunger 14, there is provided a contact pressure spring 18 which absorbs any dimensional tolerance in the distance between the movable contact 15 and the stationary contact 17 and which adjusts the contact pressure of the movable contact 15 with respect to the stationary contact 17. Between an inner peripheral portion of the solenoid case 7 and the lever 5 side end of the plunger 14, there is provided a separation spring 19 urging the plunger 14 so as to separate the movable contact 15 from the stationary contact 17.

The motor 1 is equipped with a stator 20 fixed to a motor case 9, and a rotatable armature 21 provided on an inner peripheral side of the stator 20.

Figure 3:
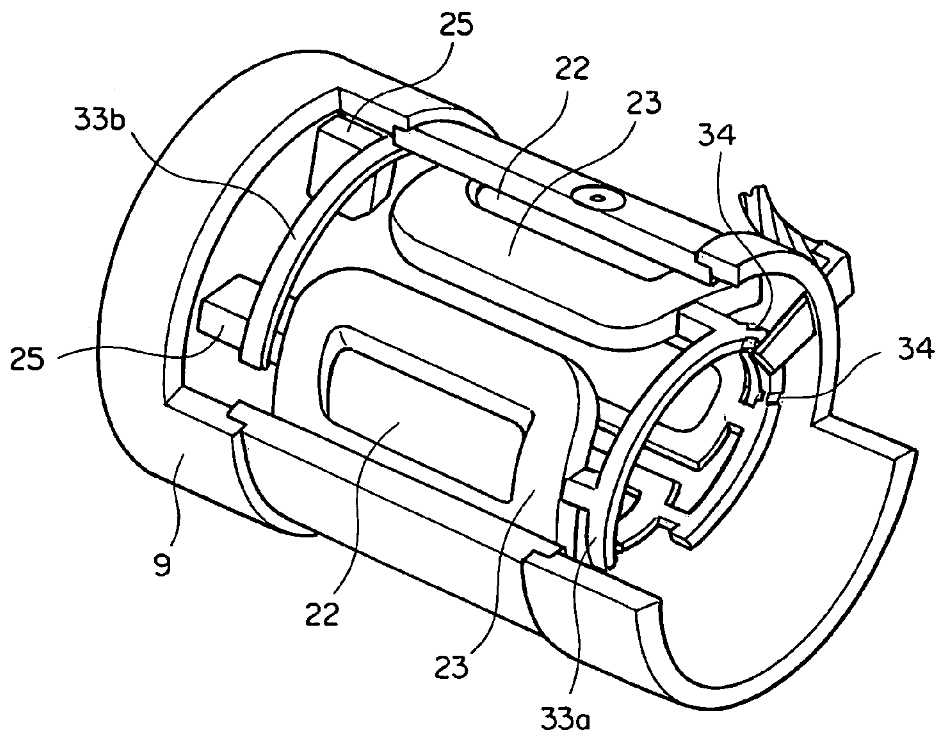
FIG. 3 is a perspective view of the starter of FIG. 1, with a motor case partially cut away to show a structure of the stator.
Figure 4:
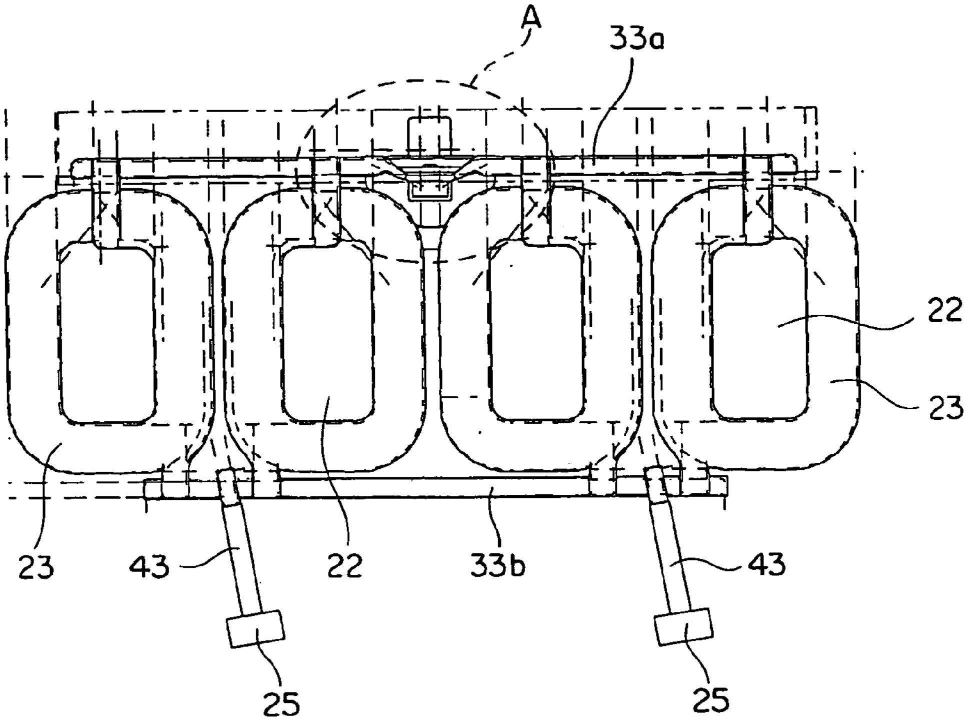
FIG. 4 is a developed view of the stator shown in FIG. 3.
Figure 5:
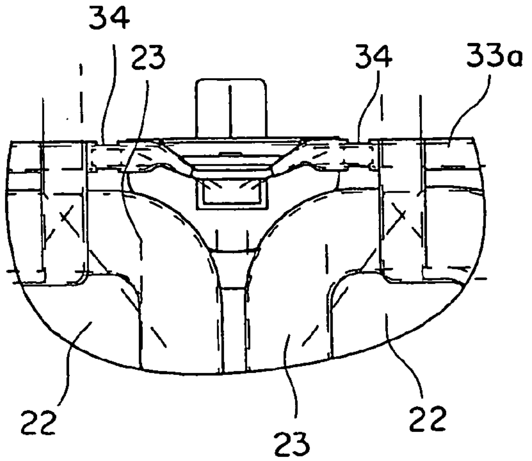
FIG. 5 is an enlarged view of a portion A of FIG. 4.

FIG. 3 is a perspective view with a part of the motor case 9 cut away to show an inner structure of the stator 20, FIG. 4 is a developed view of the stator 20 shown in FIG. 3, and FIG. 5 is an enlarged view of a portion A of FIG. 4.

The stator 20 is equipped with stator cores 22, field coils 23 formed by winding copper conductors around the stator cores 22, and C-shaped metal conductors 33*a* and 33*b* respectively fixed to both sides of the field coils 23. Formed in the metal conductor 33*a* arranged on an upstream side of the field coils 23, to which an electric current is supplied, is a narrowed portion 34 having a small sectional area and endowed with a fuse function. The metal conductor 33*b* is connected through the intermediation of brushes 25 and pigtails 43. The field coils 23 and the metal conductors 33*a* and 33*b* are formed of copper.

Next, an operation of the starter, constructed as described above, will be illustrated mainly with reference to the circuit diagram of FIG. 2.

When a start switch 31 of the starter is turned on, an electric current from a battery 30 flows through a switch terminal 32(S) to the suction coil 11 and the retaining coil 12, and the plunger 14 and the movable contact 15 are driven toward the stationary contact 17 against the elastic force of the separation spring 19. At the same time, the plunger 14 pushes the one-way clutch 3 and the pinion gear 4 toward a ring gear 40 through the intermediation of the lever 5. Then, the movable contact 15 is brought into face contact with the stationary contact 17, with an elastic force due to the contact pressure spring 18 being imparted thereto. Thus, the motor 1 is energized, and the pinion gear 4 rotates.

In this way, the pinion gear 4 is pushed out while rotating, and is engaged with the ring gear 40 to thereby start the engine. When the movable contact 15 is brought into face contact with the stationary contact 17, the potentials at the ends of the suction coil 11 become equal to each other, so the supply of electricity to the suction coil 11 is stopped. However, the supply of electricity to the retaining coil 12 is continued, and due to a magnetic flux formed by the retaining coil 12, the movable contact 15 and the stationary contact 17 are maintained in the state in which they are in face contact with each other.

Next, when the start switch 31 is turned off, the electric current from the battery 30 flows to the stationary contact 17, with which the movable contact 15 is in face contact, and to a motor terminal 16(M), and then to the ground via the suction coil 11, the switch terminal 32, and the retaining coil 12. As a result, the respective magnetic fluxes of the suction coil 11 and the retaining coil 12 cancel each other, and the suction force is lost, so the movable contact 15 and the plunger 14 are pushed back by the elastic force of the separation spring 19. Then, the movable contact 15 is separated from the stationary contact 17, and the battery 30 ceases to supply electricity to the motor 1, and at the same time, the pinion gear 4 moves with the lever 5, which rotates as a result of the movement of the plunger 14, canceling the engagement of the pinion gear 4 and the ring gear 40.

If, for some reason, the start switch 31 continues to be ON, the motor 1 is energized for a long period of time. When this condition persists, the field coils 23, the commutators 41, the armature 21, etc. undergo dead earth or layer short to generate a short-circuit current, which is inclined to flow into the interior of the motor 1 through the metal conductor 33*a* on a current inlet side of the motor 1. However, the narrowed portion 34 of the metal conductor 33*a*, which has large resistance and large heat generation amount, reaches the fusing temperature, and undergoes a fusing immediately to cut off the electric current, so breakage of the components inside the motor 1 due to abnormal current is prevented.

Further, if, for some reason, the movable contact 15 remains fusion-bonded, for example, to the stationary contact 17, and is not restored to the former position, the motor 1 is continuously energized even if the start switch 31 is turned off. At this time, the movable contact 15 and the plunger 14 are integrated with each other, and the plunger 14 is also incapable of moving, so the pinion gear 4 is not restored to the former position but remains engaged with the ring gear 40, and the motor 1 continues to rotate in this state.

Although not shown, in the case of a starter of a type in which the plunger and the movable contact are separate from each other, the motor continues to rotate, with the pinion gear restored to the former position.

In either type of starter, when such a state persists and a short-circuit current is generated, the short-circuit current is inclined to flow into the interior of the motor 1. In such a case, however, the narrowed portion 34 of the metal conductor 33*a* is immediately undergoes a fusing to cut off the electric current, so breakage of the components inside the motor 1 due to abnormal current is prevented.

As described above, in the starter of the above construction, the metal conductor 33*a* is connected to the upstream side of the field coils 23 to which the electric current is supplied, and the metal conductor 33*a* has the narrowed portion 34 having a small sectional area and endowed with a fuse function.

Thus, when the motor 1 is continuously energized and abnormal current would flow into the interior of the motor 1, the flow of electric current is reliably cut off, and it is possible to suppress generation of current cutoff during normal use.

Further, the rigid metal conductor 33*a* is fixed to the field coils 23, so it is possible to suppress an occurrence of a situation in which the metal conductor 33*a* comes into contact with a nearby component to cause short-circuiting, making it impossible to cut off the battery current.

Further, the metal conductor 33*a* is obtained by forming the narrowed portion 34 in an existing metal conductor fixed to the field coils 23, so there is no need to take the trouble to additionally provide a component endowed with a fuse function, thereby suppressing an increase in production cost.

The value of the electric current at which fusing occurs can be easily adjusted by changing the width and depth of the narrowed portion 34.

Embodiment 2

This embodiment is the same as Embodiment 1 in that the field coils 23 are formed of copper. It differs from Embodiment 1 in that the entire metal conductor 33*a* is formed of brass, which has a large electrical resistance value than copper, and is endowed with a fuse function.

In this embodiment, the metal conductor 33*a* is formed of brass, whose electrical resistance value is larger than that of copper, of which the field coils 23 are formed, and is endowed with a fuse function, so if any short-circuit current generated would flow into the interior of the motor 1, a fusing occurs at a certain position due to heat generation of the metal conductor 33*a* itself to cut off the electric current, whereby breakage of the components inside the motor 1 due to abnormal current is prevented.

It is also possible, as in Embodiment 1, to form the narrowed portion 34 in the metal conductor 33*a* formed of brass, thereby reliably cutting off electric current at the narrowed portion 34.

In Embodiments 1 and 2, the field coils 23 are formed of copper. As for the metal conductor 33*a*, it is formed of copper in Embodiment 1, and of brass in Embodiment 2. In the present invention, however, materials to be used are naturally not restricted to the above-mentioned ones. The metal conductor may be formed of any other material as long as it has a larger electrical resistance than the field coils and is endowed with a fuse function.

What is claimed is:

1. A starter comprising: a motor having a field coil; and an electromagnetic switch for supplying an electric current from a battery to the motor to start an engine through a pinion gear, wherein a metal conductor is connected to an upstream side of the field coil to which the electric current is supplied, and the metal conductor is endowed with a fuse function and is composed of a material having a larger electrical resistance than the field coil; and wherein the field coil is formed of copper, and the entire metal conductor is formed of brass.

2. A starter according to claim 1, wherein the metal conductor has a narrowed portion having a small sectional area.

* * * * *